Feb. 10, 1931.   H. S. WALTHERS ET AL   1,792,205
CUTTER HEAD
Filed April 12, 1930
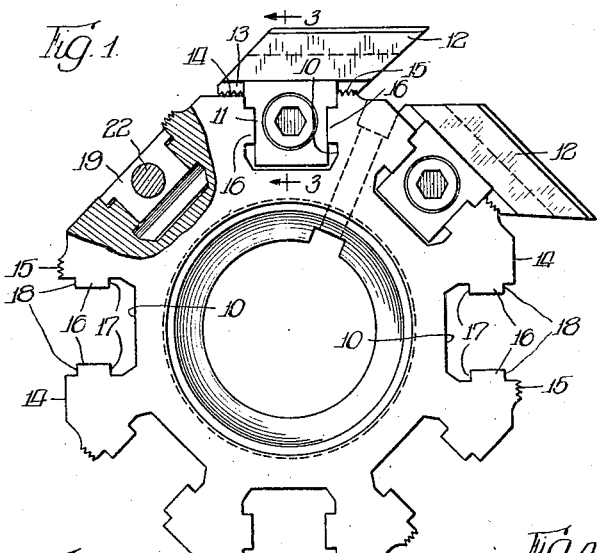
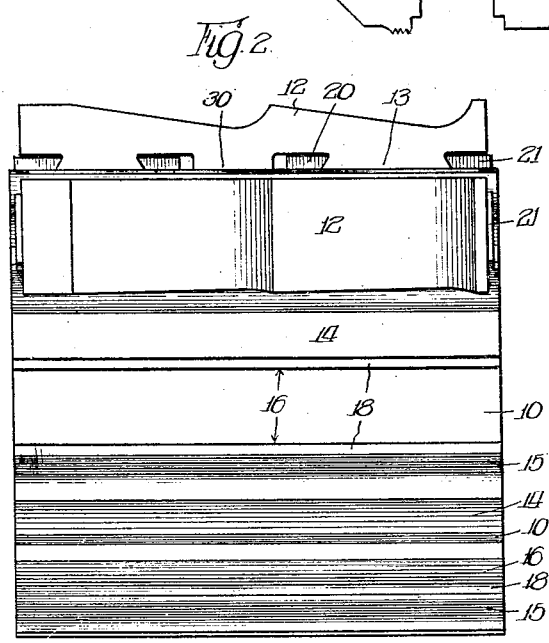
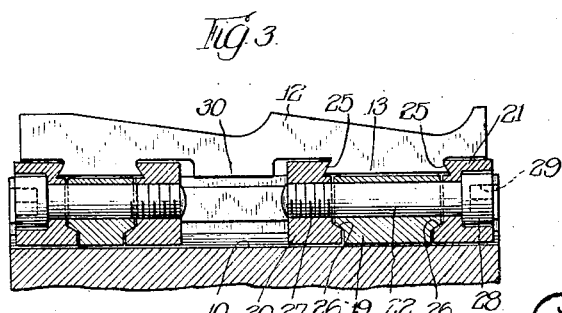
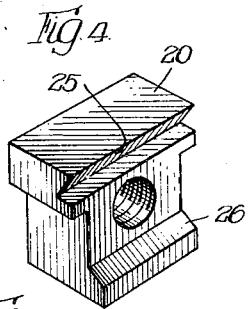
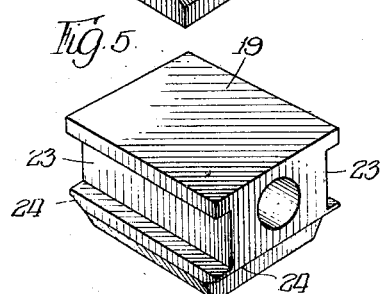
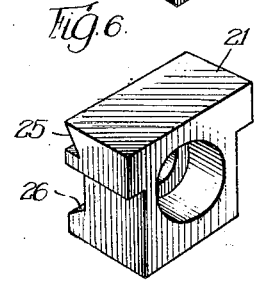
Inventors:
Harry S. Walthers,
Victor E. Martin,
By Cromwell, Priest + Warden attys.

Patented Feb. 10, 1931

1,792,205

UNITED STATES PATENT OFFICE

HARRY S. WALTHERS AND VICTOR E. MARTIN, OF BELOIT, WISCONSIN, ASSIGNORS TO YATES-AMERICAN MACHINE COMPANY, OF BELOIT, WISCONSIN, A CORPORATION OF DELAWARE

CUTTER HEAD

Application filed April 12, 1930. Serial No. 443,655.

This invention has to do with the cutter heads which are used in wood working machines, and is particularly concerned with the manner in which the bits are attached to the heads.

The principal object of the invention is to provide an improved fastening device with which a bit can be quickly and securely attached to a cutter head.

Another important object is to provide a novel fastening device which when loosened will float laterally of the head with the bit into any desired position of adjustment.

Other objects and advantages of the invention will be apparent to those skilled in the art upon a full understanding of the construction, arrangement and operation of the fastening device.

One form of the invention is presented herein for the purpose of exemplification, but it will of course be understood that the invention is susceptible of embodiment in other structurally modified forms coming equally within the scope of the appended claims.

In the accompanying drawing:

Fig. 1 is an end view of a cutter head equipped with the fastening device of the invention;

Fig. 2 is a face view of the head;

Fig. 3 is a radial section through the head, taken on the line 3—3 of Fig. 1;

Fig. 4 is a perspective view of one of the side clamps;

Fig. 5 is a similar view of the center block; and

Fig. 6 is a similar view of the other side clamp.

The cutter head shown in the drawing is provided with a plurality of transversely extending grooves 10 in which the fastening devices 11 for the bits 12 are positioned. The bits 12 overlie the grooves 10 and are provided on their inner surfaces with dovetail tongues 13 which extend tangentially of the head at right angles to the grooves 10.

The tongues 13 are transversely corrugated and seat against flat coplanar surfaces 14 and 15 on the head at opposite sides of the grooves 10. The surfaces 15 in front of the grooves are transversely corrugated and interlock to an extent with the corrugations on the front portions of the tongues 13. The sides of the grooves 10 are provided with ribs 16 which present inwardly facing shoulders 17 and outwardly facing shoulders 18.

The fastening devices 11 consist of center blocks 19, side clamps 20, side clamps 21, and tie bolts 22. The blocks 19 are positioned in the grooves 10 in the head beneath the tongues 13 on the bits, as shown in Fig. 3, and are provided with grooves 23 in the sides thereof which interfit with the tongues 16 on the sides of the grooves 10 and hold the blocks substantially flush with the surfaces 14 and 15. The blocks 19 are apertured from end to end for the reception of the bolts 22 and are provided at their ends with inclined surfaces 24 for wedging coaction with the clamps 20 and 21.

The clamps 20 and 21 are positioned in the grooves 10 at opposite ends of the blocks 19 and are provided with inclined downwardly wedging surfaces 25 and inclined upwardly wedging surfaces 26. The surfaces 25 engage with the correspondingly inclined side edges of the tongues 13 on the bits, while the surfaces 26 engage with the correspondingly inclined surfaces 24 on the ends of the blocks 19. The clamps 20 and 21 are apertured for the reception of the bolts 22. The apertures in the clamps 20 are screw-threaded to engage with the threads 27 on the bolts, while the apertures in the clamps 21 are countersunk to receive the heads 28 of the bolts, which heads are preferably provided with wrench sockets 29. When the clamps 20 and 21 are drawn together by the bolts 22, they tend to force the blocks 19 outwardly into firm interlocking engagement with the shoulders 17 of the ribs 16 on the sides of the grooves 10 and serve to force the bits 12 inwardly against the surfaces 14 and 15 of the head, thereby holding the bits 12 securely in proper cutting position.

To advance or retract the bits 12, it is merely necessary to loosen the bolts 22 a sufficient amount to allow the tongues 13 to slide longitudinally between the wedging surfaces 25 of the clamps, while to adjust the bits laterally, it is merely necessary to loosen the bolts 22 enough to permit the clamping devices to float in the grooves 10 and shift transversely of the head with the bits.

The number of the clamping devices used with each bit will of course depend upon the width of the latter. In the particular assembly shown in the drawing, the bits 12 are of such width to make the use of two holding devices for each advisable. Where two holding devices are employed, the center portions 30 of the bits are advantageously made flush with the tongues 13 (see Fig. 3).

We claim:

1. In a fastening device of the character described, the combination with a cutter head having a transverse groove therein, and a bit having a tongue on the bottom thereof at right angles to the groove, of a block beneath the tongue in outwardly locked association with the groove, and clamps at the ends of the block engageable with the latter and the tongue to draw the bit radially toward the head.

2. In a fastening device of the character described, the combination with a cutter head having a transverse groove therein, and a bit having a tongue on the bottom thereof at right angles to the groove, of a block beneath the tongue in outwardly locked association with the groove, and clamps at the ends of the block engageable with the latter and the tongue to draw the bit radially toward the head, said block and clamps being shiftable as a unit transversely of the head within the groove when the clamps are loosened, whereby to permit lateral adjustment of the bit.

3. In a fastening device of the character described, the combination with a cutter head having a transverse groove therein, and a bit having a tongue on the bottom thereof at right angles to the groove, of a block beneath the tongue in outwardly locked association with the groove, and clamps at the ends of the block engageable with the latter and the tongue to draw the bit radially toward the head, said bit, when the clamps are loosened, being capable of advancement or retraction independently of the fastening device and being shiftable laterally as a unit with the fastening device.

4. The combination with a cutter head having a transverse groove therein, of a bit having a tongue on the bottom thereof at right angles to the groove, and a fastening device in the groove beneath the tongue consisting of a center block locked in the groove against outward movement, and two side clamps wedged against both the ends of the block and the sides of the tongue to press the center block outwardly and draw the bit inwardly.

In witness whereof we have hereunto subscribed our names.

HARRY S. WALTHERS.
VICTOR E. MARTIN.